United States Patent
Park et al.

(10) Patent No.: US 9,077,266 B2
(45) Date of Patent: Jul. 7, 2015

(54) APPARATUS OF CONTROLLING VEHICLE PROVIDED WITH MOTOR AND CONTROL METHOD THEREOF

(71) Applicant: Hyundai Motor Company, Seoul (KR)

(72) Inventors: Jooyoung Park, Yongin-si (KR); Byunghoon Yang, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 59 days.

(21) Appl. No.: 14/144,378

(22) Filed: Dec. 30, 2013

(65) Prior Publication Data

US 2015/0048765 A1 Feb. 19, 2015

(30) Foreign Application Priority Data

Aug. 14, 2013 (KR) .......................... 10-2013-0096842

(51) Int. Cl.
   *H02P 6/00* (2006.01)
   *H02P 21/00* (2006.01)

(52) U.S. Cl.
   CPC ............ *H02P 6/002* (2013.01); *H02P 21/0035* (2013.01)

(58) Field of Classification Search
   CPC ....................................... H02P 6/002
   USPC ................. 318/400.02, 400.01, 700
   See application file for complete search history.

(56) References Cited

U.S. PATENT DOCUMENTS 8,853,979 B2 * 10/2014 Wu et al. .................. 318/400.02

FOREIGN PATENT DOCUMENTS

| JP | 2002-136171 A | 5/2002 |
| JP | 2012-136202 A | 7/2012 |
| KR | 10-1093517 B1 | 12/2011 |
| KR | 10-2013-0060047 A | 6/2013 |

* cited by examiner

*Primary Examiner* — David S Luo
(74) *Attorney, Agent, or Firm* — McDermott Will & Emery LLP

(57) ABSTRACT

An apparatus for controlling a vehicle provided with a motor includes a current command generator that determines first and second axes currents according to driving conditions, and a current controller that generates first and second axes voltages by using the first and second axes currents and feedback currents. An axis converter converts the first and second axes voltages into 3-phase voltages, 3-phase feedback currents into first and second axes feedback currents, and transmits the same to the current controller. A pulse width modulation (PWM) generator receives the 3-phase voltages and generates corresponding 3-phase signals, and a PWM inverter generates 3-phase currents and transmits the same to the axis converter. A motor is driven by the 3-phase currents. A resolver detects a phase of the motor and transmits the same to the current command generator and the axis converter. A resolver offset determining unit calculates a resolver offset value.

9 Claims, 4 Drawing Sheets

APPARATUS OF CONTROLLING VEHICLE PROVIDED WITH MOTOR AND CONTROL METHOD THEREOF

CROSS-REFERENCE TO RELATED APPLICATION

This application claims priority to and the benefit of Korean Patent Application No. 10-2013-0096842 filed in the Korean Intellectual Property Office on Aug. 14, 2013, the entire contents of which are incorporated herein by reference.

BACKGROUND OF THE INVENTION (a) Technical Field

The present disclosure relates to an apparatus for controlling a vehicle, and a control method thereof, and more particularly, to apparatus and method for controlling a vehicle with improved motor control performance by easily determining whether to automatically correct an offset value upon determination of a resolver offset while the vehicle is running.

(b) Description of the Related Art

In general, a motor control unit (MCU) is used to control a motor provided in an electric vehicle or a hybrid vehicle. To this end, a resolver is used to measure the absolute position of the rotor with respect to the stator of the vehicle motor.

A resolver is a type of transformer, in which when an excitation voltage is applied to a primary winding to rotate the axis of the resolver, a magnetic coupling coefficient is changed to generate a voltage that changes an amplitude of a carrier in a secondary winding. In this case, windings are arranged such that the generated voltage is changed in the form of sinusoidal waves of sine and cosine with respect to a rotation angle of the axis. Thus, a rotation angle of the resolver may be calculated by reading a carrier amplitude ratio between a sine output and a cosine output.

The resolver operating based on the foregoing principle detects speed information and phase of the motor and provides position information regarding the rotor to an MCU, where position information regarding the rotor is used as information for generating torque and speed commands.

However, measuring an absolute position of the rotor with respect to the stator by using the resolver generates an offset due to various factors such as assembly tolerance between the resolver and the motor, inaccuracy in the position of a coil within the resolver, and the like.

The generated offset makes it impossible to measure an accurate absolute position of the rotor with respect to the stator. Thus, the motor cannot be controlled normally.

Conventionally, in order to correct offset generated in the resolver, waveforms of a line-to-line back electromotive force of the motor and the resolver are analyzed using a measurement instrument such as an oscilloscope, and the offset value with respect to the sensing error is thereby corrected.

However, such a method is performed through manual operation by an operator, requiring much time to correct the offset. Thereby, workload of the operator is increased, and an offset value of every vehicle is required to be corrected, which is impractical. In addition, different offset correction values may be obtained according to differing skills of operators.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus of controlling a vehicle provided with a motor and a control method thereof having advantages of precisely calculating a resolver offset and monitoring the same when a vehicle is running.

The present invention has been made in an effort to provide an apparatus and method for controlling a vehicle provided with a motor having advantages of enhancing control performance of a motor by providing an accurately calculated resolver offset to a motor control unit (MCU).

The present invention has been made in an effort to provide an apparatus and method for controlling a vehicle provided with a motor having advantages of reducing cost for fabricating a vehicle by calculating a resolver offset generated during a vehicle installation process by software, rather than correcting it using external equipment.

An exemplary embodiment of the present invention provides an apparatus of controlling a vehicle provided with a motor, including: a current command generator configured to determine first and second axes currents according to driving conditions; a current controller configured to generate first and second axes voltages by using the first and second axes currents generated by the current command generator and first and second axes feedback currents; an axis converter configured to convert the first and second axes voltages into 3-phase voltages, convert 3-phase feedback currents into first and second axes feedback currents, and transmit the converted 3-phase voltages and the converted first and second axes feedback currents to the current controller; a pulse width modulation (PWM) generator configured to receive the 3-phase voltages from the axis converter and generate corresponding 3-phase signals; a PWM inverter configured to generate 3-phase currents from the 3-phase signals and transmit the 3-phase currents as 3-phase feedback currents to the axis converter; a motor configured to be driven upon receiving the 3-phase currents from the PWM inverter; a resolver configured to detect a phase of the motor and transmit the detected phase of the motor to the current command generator and the axis converter; and a resolver offset determining unit configured to calculate a resolver offset value $\alpha$ by using a D axis voltage value $v_d$ and a Q axis voltage value $v_q$ sensed at a certain speed of the motor, mapping data with respect to a current command or a torque command at the certain speed of the motor, and an offset candidate value.

The mapping data may be generated by a D axis voltage value and a Q axis voltage value calculated in a state in which a resolver offset is corrected over a temperature and a current command or a torque command in a certain testing environment and a D axis voltage value and a Q axis voltage value when zero current controlling is performed in a state in which a resolver offset is corrected.

The resolver offset value $\alpha$ may be calculated by the following equation:

$$\alpha = \alpha^* - \arcsin\left(\frac{V_d - V_{d\text{-}resolver}}{V_{q\text{-}resolver\text{-}zero}}\right).$$

Here, $\alpha$ is a resolver offset value, $\alpha^*$ is an offset candidate value, $v_d$ is a D axis voltage value, $v_q$ is a Q axis voltage value, $v_{d\text{-}resolver}$ is a D axis voltage value output from mapping data, and $v_{q\text{-}resolver\text{-}zero}$ is a Q axis voltage value output from the mapping data after zero current controlling.

The resolver offset value α may be calculated by the following equation:

$$\alpha = \alpha^* + \arccos\left(\frac{v_q - v_{q\text{-}resolver} + v_{q\text{-}resolver\text{-}zero}}{v_{q\text{-}resolver\text{-}zero}}\right).$$

Here, α is a resolver offset value, α* is an offset candidate value, $v_q$ is a Q axis voltage value, $v_{q\text{-}resolver}$ is a Q axis voltage value output from mapping data, and $v_{q\text{-}resolver\text{-}zero}$ is a Q axis voltage value output from the mapping data after zero current controlling.

The resolver offset value α may be calculated by the following equation:

$$\alpha = \alpha^* - \arctan\left(\frac{V_d + V_{d\text{-}resolver}}{V_q - V_{q\text{-}resolver} + V_{q\text{-}resolver\text{-}zero}}\right)$$

Here, α is a resolver offset value, α* is an offset candidate value, $v_d$ is a D axis voltage value, $v_q$ is a Q axis voltage value, $v_{d\text{-}resolver}$ is a D axis voltage value output from mapping data, $v_{q\text{-}resolver}$ is a Q axis voltage value output from the mapping data, and $v_{q\text{-}resolver\text{-}zero}$ is a Q axis voltage value output from the mapping data after zero current controlling.

Another embodiment of the present invention provides a method for controlling a vehicle provided with a motor, including: determining whether a rotational speed of a motor has reached a particular rotational speed; when it is determined that the motor has reached the particular rotational speed, determining whether a feedback current has been converged according to a type of mapping data; and when it is determined that the feedback current has been converged, calculating a resolver offset value α by using a D axis voltage value and a Q axis voltage value of the motor, mapping data of a current command and a torque command at a certain speed of the motor, and an offset candidate value.

the resolver offset value α may be calculated by equation of $$\alpha = \alpha^* - \arcsin\left(\frac{V_d - V_{d\text{-}resolver}}{V_{q\text{-}resolver\text{-}zero}}\right).$$

wherein α is a resolver offset value, α* is an offset candidate value, $v_d$ is a D axis voltage value, $v_q$ is a Q axis voltage value, $v_{d\text{-}resolver}$ is a D axis voltage value output from mapping data, and $v_{q\text{-}resolver\text{-}zero}$ is a Q axis voltage value output from the mapping data after zero current controlling.

the resolver offset value α may be calculated by the following equation:

$$\alpha = \alpha^* + \arccos\left(\frac{v_q - v_{q\text{-}resolver} + v_{q\text{-}resolver\text{-}zero}}{v_{q\text{-}resolver\text{-}zero}}\right).$$

wherein α is a resolver offset value, α* is an offset candidate value, $v_q$ is a Q axis voltage value, $v_{q\text{-}resolver}$ is a Q axis voltage value output from mapping data, and $v_{q\text{-}resolver\text{-}zero}$ is a Q axis voltage value output from the mapping data after zero current controlling.

the resolver offset value α is calculated by the following equation:

$$\alpha = \alpha^* - \arctan\left(\frac{V_d - V_{d\text{-}resolver}}{V_q - V_{q\text{-}resolver} + V_{q\text{-}resolver\text{-}zero}}\right)$$

wherein α is a resolver offset value, α* is an offset candidate value, $v_d$ is a D axis voltage value, $v_q$ is a Q axis voltage value, $v_{d\text{-}resolver}$ is a D axis voltage value output from mapping data, $v_{q\text{-}resolver}$ is a Q axis voltage value output from the mapping data, and $v_{q\text{-}resolver\text{-}zero}$ is a Q axis voltage value output from the mapping data after zero current controlling.

BRIEF DESCRIPTION OF THE DRAWINGS

The following drawings appended to the specification illustrate embodiments of the present invention to serve a technical concept of the present invention to be understood easily together with detailed descriptions of the present invention, so the present invention should not be meant to restrict the invention to the matters illustrated in the accompanying drawings.

DETAILED DESCRIPTION OF THE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clarify the present invention, portions irrespective of description are limited and like numbers refer to like elements throughout the specification.

Figure 1:
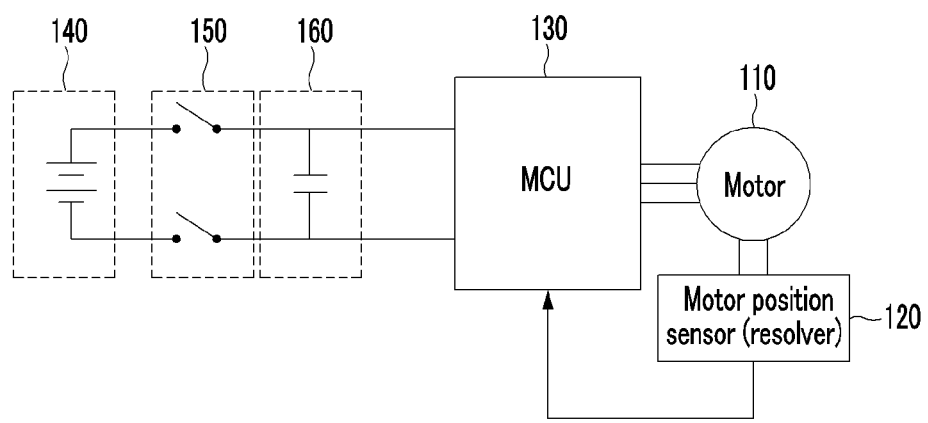
FIG. 1 is a view illustrating a schematic configuration of a vehicle provided with a motor according to an embodiment of the present invention.

FIG. 1 is a view illustrating a schematic configuration of a vehicle provided with a motor according to an embodiment of the present invention. As illustrated in FIG. 1, the vehicle including a motor according to an embodiment of the present invention includes a motor 110, a resolver 120, a motor control unit (MCU) 130, a high voltage battery 140, a main relay 150, a capacitor 160, and a battery management system (BMS).

The vehicle having a motor may be applied to a hybrid vehicle, an electric vehicle, or a fuel cell vehicle. In this case, the motor 110 may be configured to simultaneously perform driving and charging.

The motor 110, serving to provide dynamic force (or power) to the vehicle, is controlled by the MCU 130. The MCU 130 includes an inverter that converts direct current (DC) into alternating current (AC) of variable frequency and variable voltage, and a controller that controls current and voltage.

The resolver 120, a motor position sensor for measuring a position of a rotor of a motor, transmits rotational position information of the motor 110 to the MCU 130, and the MCU 130 controls current and voltage to be supplied to the motor 110 on the basis of the rotational position information.

The MCU may be provided as one or more processors operating under control of a pre-set program, and the pre-set program may be configured to perform each operation of a method of controlling a vehicle provided with a motor according to an embodiment of the present invention.

Figure 2:
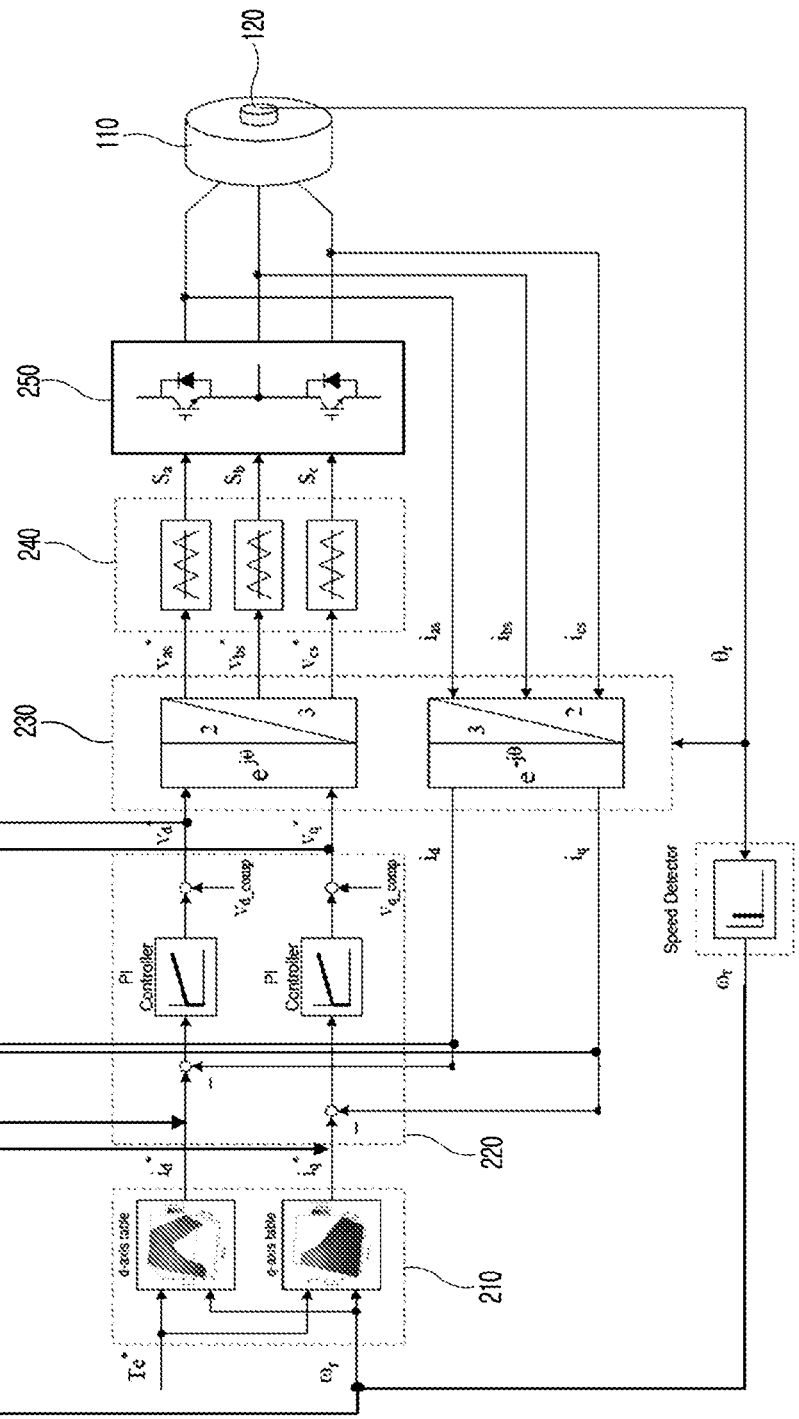
FIG. 2 is a circuit diagram of a motor control unit (MCU) control unit that controls the motor according to an embodiment of the present invention.

FIG. 2 is a circuit diagram of an MCU control unit that controls the motor according to an embodiment of the present invention. As illustrated in FIG. 2, a controller of the MCU 130 includes a current command generating unit 210, a current controller 220, an axis converter 230, a pulse width modulation (PWM) generator 240, a PWM inverter 250, and a resolver offset determining unit 260.

The current command generator 210 determines a D axis current and a Q axis current according to driving conditions of the vehicle. To this end, the current command generator 210 has a D axis current map and a Q axis current map. Thus, when a torque T* required for current driving conditions and a current speed ω of the motor 110 are input to the current command generator 210, the current command generator 210 calculates a D axis current $i_d^*$ and a Q axis current $i_q^*$ corresponding to the torque and the speed of the motor.

The current controller 220 calculates a D axis voltage $V_d^*$ and a Q axis voltage $V_q^*$ by using the D axis current $i_d^*$ and the Q axis current $i_q^*$ and a D axis feedback current $i_d$ and a Q axis feedback current $i_q$ delivered from the current command generator 210.

The axis converter 230 receives the D axis voltage Vd* and the Q axis voltage Vq* from the current controller 220 and converts the received voltages into a 3-phase AC voltages Va*, Vb*, and Vc*. Also, the axis converter 230 receives 3-phase ACs ia, ib, and ic applied to the motor 110 as feedback currents and converts the received feedback currents into a D axis feedback current id and a Q axis feedback current iq.

The PWM generator 240 converts the 3 phase AC voltages Va*, Vb*, and Vc* from the axis converter 2300 and converts the same into 3-phase switching signals Sa, Sb, and Sc.

The PWM inverter 250 includes a plurality of switching elements. The PWM inverter 250 receives the 3-phase switching signals $S_a$, $S_b$, and $S_c$ from the PWM generator 240 and converts the same into 3-phase ACs $i_a$, $i_b$, and $i_c$.

The motor 110 is driven upon receiving the 3-phase ACs $i_a$, $i_b$, and $i_c$ from the PWM inverter 250.

The resolver 120 is installed in the motor 110 to detect the phase of the motor 110, and delivers the detected phase to the axis converter 230 and the current command generator 210.

The resolver offset determining unit 260 determines an offset of the resolver 120 by using a torque command and a current command delivered from the current command generator 210, a current and a speed fed back from the motor 110, monitored D axis and Q axis voltages, and the like.

In an embodiment of the present invention, a resolver offset is calculated during zero current controlling or even during a basic torque control section, while the vehicle is running.

Figure 3:
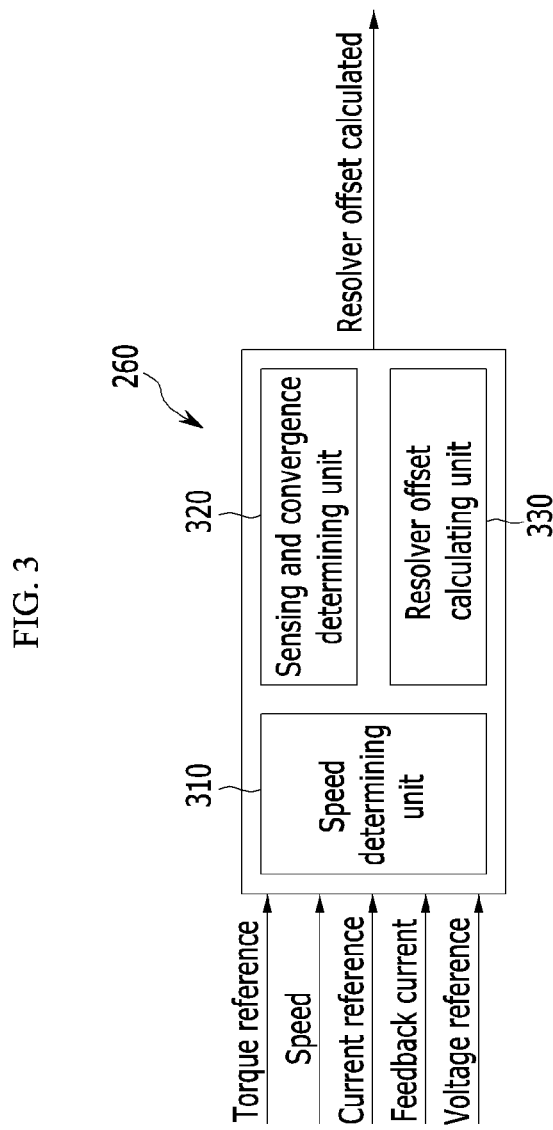
FIG. 3 is a conceptual view illustrating a configuration of a resolver offset calculating unit according to an embodiment of the present invention.

FIG. 3 is a schematic view illustrating the resolver offset determining unit 260 according to an embodiment of the present invention. As illustrated in FIG. 3, the resolver offset determining unit 260 includes a speed determining unit 310, a sensing and convergence determining unit 320, and a resolver offset calculating unit 330.

The speed determining unit 310 monitors a current speed and torque command of the motor 110, and determines whether the motor has reached a particular speed. The sensing and convergence calculating unit 320 senses a torque command, a current command, a voltage command, and feedback current, and determines whether the feedback current has been converged. Also, the resolver offset calculating unit 3330 calculates an offset of the resolver by using the sensed speed and voltage of the motor 110.

Hereinafter, a method of calculating an offset of the resolver will be described in detail. First, a voltage equation of the motor related to the resolver while the vehicle is running has the relationship of Equation 1.

$$v_d = \left(R + L_d \frac{d}{dt}\right)i_d - \omega L_q i_q - \omega \Psi_F \sin(\alpha - \alpha^*) \quad \text{(Equation 1)}$$

$$v_q = \left(R + L_q \frac{d}{dt}\right)i_q - \omega L_q i_d + \omega \Psi_F \cos(\alpha - \alpha^*)$$

Here, R is resistance applied to the motor, $L_d$ is D axis inductance, $L_q$ is Q axis inductance, $\Psi_F$ is a magnitude of magnetic flux, α is an actual offset, α* is an offset candidate value, $V_d$ is a D axis voltage, $V_q$ is a Q axis voltage, and ω is an angular velocity of a rotor. Here, the offset candidate value α* is a value stored in the MCU, rather than an actual resolver offset value.

A voltage equation in a certain rotational speed $\omega_{REF}$, of the motor rotor has the relationship of Equation 2.

$$V_d = \left(R + L_d \frac{d}{dt}\right)i_d - \omega_{REF} L_q i_q - \omega_{REF} \Psi_F \sin(\alpha - \alpha^*) \quad \text{(Equation 2)}$$

$$V_q = \left(R + L_q \frac{d}{dt}\right)i_q - \omega_{REF} L_d i_d + \omega_{REF} \Psi_F \cos(\alpha - \alpha^*)$$

In this case, in Equation 2, when zero current controlling is performed in a certain testing environment, rather than in a state in which the motor is installed in the vehicle, a D axis current and a Q axis current are converged to 0, so Equation 2 has the relationship of Equation 3.

$$v_d = -\omega_{REF} \Psi_F \sin(\alpha - \alpha^*)$$

$$v_q = +\omega_{REF} \Psi_F \cos(\alpha - \alpha^*) \quad \text{(Equation 3)}$$

A resolver offset value in the certain testing environment can be obtained from Equation 3. Here, when the calculated resolver offset value is substituted for Equation 2 and Equation 3, Equation 2 and Equation 3 may be modified as follows.

$$V_{d\text{-}resolver} = \left(R + L_d \frac{d}{dt}\right)i_d - \omega_{REF} L_q i_q \quad \text{(Equation 4)}$$

$$V_{q\text{-}resolver} = \left(R + L_q \frac{d}{dt}\right)i_q - \omega_{REF} L_d i_d + \omega_{REF} \Psi_F$$

$$V_{d\text{-}resolver\text{-}zero} = 0 \quad \text{(Equation 5)}$$

$$V_{q\text{-}resolver\text{-}zero} = +\omega_{REF} \Psi_F$$

The voltage values calculated in Equation 4 and Equation 5 are values according to temperature and current commands at different certain motor speeds. Thus, the voltage values may be configured as a map according to the speed and temperature of the motor and a change in the current command.

Resistance R and a magnitude $\Psi_F$ of magnetic flux are variables related to temperature, and inductance DeletedTextsandDeletedTextsare variables related to a current amount. Thus, mapping data may be secured by using a D axis current, a Q axis current, and temperature information at the certain speed DeletedTextsof the motor rotor.

Namely, the voltage values calculated by Equation 4 are a D axis voltage value and a Q axis voltage value calculated in a state in which a resolver offset was corrected over the temperature and current commands in the certain testing environment, and the voltage values calculated by Equation 4 are a D axis voltage value and a Q axis voltage value when zero current controlling was performed in a state in which the resolver offset was corrected.

In general, in the case of a current command, since it is configured as a map corresponding to required torque, $v_d$ and $v_q$ mapping data may be secured by using a torque command. Also, the rotational speed of the motor may be used to secure mapping data at a certain rotational speed of the motor.

Namely, mapping data may be secured by a temperature and current command, by a temperature and torque command, or by a temperature, a current command, and a speed of the motor.

As a $v_d$ $v_q$ mapping method, any one the method using a current command and the method using a torque command as described above may be selected, and it is important to output $v_{d\text{-}resolver}$, $v_{q\text{-}resolver}$ and $v_{q\text{-}resolver\text{-}zero}$ according to required circumstances.

Thereafter, in order to obtain a resolver offset value in a state in which the motor is actually installed in the vehicle, the following process may be performed by using Equation 3 and Equation 4.

First, When Equation 2 is subtracted from Equation 4, the relationship of Equation 6 is obtained.

$$v_{d\text{-}resolver} = -\omega_{REF}\Psi_F \sin(\alpha - \alpha^*)$$

$$v_{q\text{-}resolver} = +\omega_{REF}\Psi_F \cos(\alpha - \alpha^*) - \omega_{REF}\Psi_F \quad \text{(Equation 6)}$$

Here, when the value $\omega_{REF}\Psi_F$ obtained from Equation 6 is substituted for Equation 6, Equation 6 is modified as follows.

$$\frac{V_d - V_{d\text{-}resolver}}{V_{q\text{-}resolver\text{-}zero}} = -\sin(\alpha - \alpha^*) \quad \text{(Equation 7)}$$

$$\frac{V_q - V_{q\text{-}resolver} + V_{q\text{-}resolver\text{-}zero}}{V_{q\text{-}resolver\text{-}zero}} = \cos(\alpha - \alpha^*)$$

A resolver offset value $\alpha$ as represented by Equation 8 may be obtained by applying Equation 9.

$$\alpha = \alpha^* - \arcsin\left(\frac{V_d - V_{d\text{-}resolver}}{V_{q\text{-}resolver\text{-}zero}}\right) \quad \text{(Equation 8)}$$

$$\alpha = \alpha^* + \arccos\left(\frac{V_q - V_{q\text{-}resolver} + V_{q\text{-}resolver\text{-}zero}}{V_{q\text{-}resolver\text{-}zero}}\right) \quad \text{(Equation 9)}$$

$$\alpha = \alpha^* - \arctan\left(\frac{V_d - V_{d\text{-}resolver}}{V_q - V_{q\text{-}resolver} + V_{q\text{-}resolver\text{-}zero}}\right) \quad \text{(Equation 10)}$$

The resolver offset value $\alpha$ calculated through Equation 8 to Equation 10 may be continuously monitored while the vehicle is running, and may be corrected as necessary, whereby control performance of the motor can be enhanced.

Hereinafter, a process of calculating an offset of the vehicle provided with the motor according to an embodiment of the present invention will be described with reference to FIG. 4.

Figure 4:
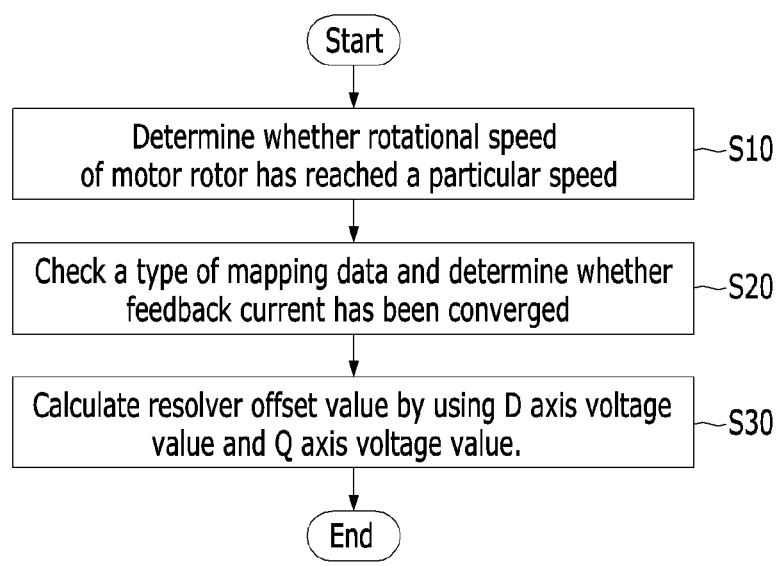
FIG. 4 is a flow chart illustrating a process of calculating a resolver offset according to an embodiment of the present invention.

As illustrated in FIG. 4, the speed determining unit of the resolver offset determining unit 260 determines whether a rotational speed $\omega_{REF}$ of the motor rotor has reached a predetermined rotational speed as a reference of mapping data (S10).

When it is determined that the rotational speed of the motor rotor has reached the certain rotational speed in the speed determining operation, the sensing and convergence determining unit 320 determines whether a reference is a current command or a torque command according to a type of the mapping data, determines whether a feedback current has converged, and subsequently outputs a D axis voltage value $v_d$ and a Q axis voltage value $v_q$ to the resolver offset calculating unit 330 (S20).

The resolver offset calculating unit 330 calculates a resolver offset value $\alpha$ by using the D axis voltage value $v_d$ and the Q axis voltage value $v_q$ output from the sensing and convergence determining unit 320 and $v_{d\text{-}resolver}$ and $v_{q\text{-}resolver}$ output from the mapping data, through Equation 8 to Equation 10 (S30).

According to embodiments of the present invention as described above, since whether an offset of the resolver is appropriate is continuously monitored while a vehicle is running and an offset of the resolver is provided to the MCU, accuracy of motor control can be enhanced.

Also, since a resolver offset generated during a process of installing the motor in a vehicle is calculated by software, rather than being corrected by external equipment, and provided to the MCU which automatically controls the motor according to the resolver offset, cost incurred for manufacturing the vehicle can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus of controlling a vehicle provided with a motor, the apparatus comprising:
    a current command generator configured to determine first and second axes currents according to driving conditions;
    a current controller configured to generate first and second axes voltages by using the first and second axes currents generated by the current command generator and first and second axes feedback currents;
    an axis converter configured to convert the first and second axes voltages into 3-phase voltages, convert 3-phase feedback currents into first and second axes feedback currents, and transmit the converted 3-phase voltages and the converted first and second axes feedback currents to the current controller;
    a pulse width modulation (PWM) generator configured to receive the 3-phase voltages from the axis converter and generate corresponding 3-phase signals;
    a PWM inverter configured to generate 3-phase currents from the 3-phase signals and transmit the 3-phase currents as 3-phase feedback currents to the axis converter;
    a motor configured to be driven upon receiving the 3-phase currents from the PWM inverter;

a resolver configured to detect a phase of the motor and transmit the detected phase of the motor to the current command generator and the axis converter; and a resolver offset determining unit configured to calculate a resolver offset value α by using a D axis voltage value $v_d$ and a Q axis voltage value $v_q$ sensed at a certain speed of the motor, mapping data with respect to a current command or a torque command at the certain speed of the motor, and an offset candidate value.

2. The apparatus of claim 1, wherein the mapping data is generated by a D axis voltage value and a Q axis voltage value calculated in a state in which a resolver offset is corrected over a temperature and a current command or a torque command in a certain testing environment and a D axis voltage value and a Q axis voltage value when zero current controlling is performed in a state in which a resolver offset is corrected.

3. The apparatus of claim 1 or 2, wherein the resolver offset value α is calculated by equation of $$\alpha = \alpha^* - \arcsin\left(\frac{V_d - V_{d\text{-}resolver}}{V_{q\text{-}resolver\text{-}zero}}\right)$$

wherein α is a resolver offset value, α* is an offset candidate value, $v_d$ is a D axis voltage value, $v_q$ is a Q axis voltage value, $v_{d\text{-}resolver}$ is a D axis voltage value output from mapping data, and $v_{q\text{-}resolver\text{-}zero}$ is a Q axis voltage value output from the mapping data after zero current controlling.

4. The apparatus of claim 1 or 2, wherein the resolver offset value α is calculated by equation of $$\alpha = \alpha^* + \arccos\left(\frac{v_q - v_{q\text{-}resolver} + v_{q\text{-}resolver\text{-}zero}}{V_{q\text{-}resolver\text{-}zero}}\right)$$

wherein α is a resolver offset value, α* is an offset candidate value, $v_q$ is a Q axis voltage value, $v_{q\text{-}resolver}$ is a Q axis voltage value output from mapping data, and $v_{q\text{-}resolver\text{-}zero}$ is a Q axis voltage value output from the mapping data after zero current controlling.

5. The apparatus of claim 1 or 2, wherein the resolver offset value α is calculated by equation of $$\alpha = \alpha^* - \arctan\left(\frac{V_q - V_{q\text{-}resolver}}{V_q - V_{q\text{-}resolver} + V_{q\text{-}resolver\text{-}zero}}\right)$$

wherein α is a resolver offset value, α* is an offset candidate value, $v_d$ is a D axis voltage value, $v_q$ is a Q axis voltage value, $v_{d\text{-}resolver}$ is a D axis voltage value output from mapping data, $v_{q\text{-}resolver}$ is a Q axis voltage value output from the mapping data, and $v_{q\text{-}resolver\text{-}zero}$ is a Q axis voltage value output from the mapping data after zero current controlling.

6. A method for controlling a vehicle provided with a motor, the method comprising:

determining whether a rotational speed of a motor has reached a particular rotational speed;

when it is determined that the motor has reached the particular rotational speed, determining whether a feedback current has been converged according to a type of mapping data; and when it is determined that the feedback current has been converged, calculating a resolver offset value α by using a D axis voltage value and a Q axis voltage value of the motor, mapping data of a current command and a torque command at a certain speed of the motor, and an offset candidate value.

7. The method of claim 6, wherein
the resolver offset value α is calculated by equation of $$\alpha = \alpha^* - \arcsin\left(\frac{V_d - V_{q\text{-}resolver}}{V_{q\text{-}resolver\text{-}zero}}\right)$$

wherein α is a resolver offset value, α* is an offset candidate value, $v_d$ is a D axis voltage value, $v_q$ is a Q axis voltage value, $v_{d\text{-}resolver}$ is a D axis voltage value output from mapping data, and $v_{q\text{-}resolver\text{-}zero}$ is a Q axis voltage value output from the mapping data after zero current controlling.

8. The method of claim 6, wherein
the resolver offset value α is calculated by equation of $$\alpha = \alpha^* + \arccos\left(\frac{v_q - v_{q\text{-}resolver} + v_{q\text{-}resolver\text{-}zero}}{v_{q\text{-}resolver\text{-}zero}}\right)$$

wherein α is a resolver offset value, α* is an offset candidate value, $v_q$ is a Q axis voltage value, $v_{q\text{-}resolver}$ is a Q axis voltage value output from mapping data, and $v_{q\text{-}resolver\text{-}zero}$ is a Q axis voltage value output from the mapping data after zero current controlling.

9. The method of claim 6, wherein
the resolver offset value α is calculated by equation of $$\alpha = \alpha^* - \arctan\left(\frac{V_d - V_{d\text{-}resolver}}{V_q - V_{q\text{-}resolver} + V_{q\text{-}resolver\text{-}zero}}\right)$$

wherein α is a resolver offset value, α* is an offset candidate value, $v_d$ is a D axis voltage value, $v_q$ is a Q axis voltage value, $v_{d\text{-}resolver}$ is a D axis voltage value output from mapping data, $v_{q\text{-}resolver}$ is a Q axis voltage value output from the mapping data, and $v_{q\text{-}resolver\text{-}zero}$ is a Q axis voltage value output from the mapping data after zero current controlling.

* * * * *